US010518272B2

(12) United States Patent
Carroll et al.

(10) Patent No.: US 10,518,272 B2
(45) Date of Patent: Dec. 31, 2019

(54) AIR CLEANER

(71) Applicant: Current Ways, Inc., Santee, CA (US)

(72) Inventors: Scott Carroll, Lakeside, CA (US); Kenneth Wing, Alpine, CA (US)

(*) Notice: Subject to any disclaimer, the term of this patent is extended or adjusted under 35 U.S.C. 154(b) by 199 days.

(21) Appl. No.: 15/550,867

(22) PCT Filed: Feb. 19, 2016

(86) PCT No.: PCT/US2016/018579
§ 371 (c)(1),
(2) Date: Aug. 14, 2017

(87) PCT Pub. No.: WO2016/134204
PCT Pub. Date: Aug. 25, 2016

(65) Prior Publication Data
US 2018/0021789 A1 Jan. 25, 2018

Related U.S. Application Data
(60) Provisional application No. 62/118,501, filed on Feb. 20, 2015.

(51) Int. Cl.
*B01D 53/02* (2006.01)
*B03C 3/86* (2006.01)
(Continued)

(52) U.S. Cl.
CPC ............ *B03C 3/86* (2013.01); *B01D 53/8675* (2013.01); *B03C 3/011* (2013.01); *B03C 3/019* (2013.01);
(Continued)

(58) Field of Classification Search
CPC .. B01D 2255/2073; B01D 2255/20761; B01D 2257/106; B01D 53/8675;
(Continued)

(56) References Cited

U.S. PATENT DOCUMENTS 3,555,818 A * 1/1971 Vlier .................. B03C 3/41
96/64
4,041,543 A * 8/1977 Pasculle .................. H01T 4/08
361/33
(Continued)

FOREIGN PATENT DOCUMENTS

CN 2880265 3/2007
JP S6146267 3/1986
(Continued)

OTHER PUBLICATIONS

Translation of JP2000279844, Oct. 10, 2000, Matsuhita.*

Primary Examiner — Christopher P Jones
(74) Attorney, Agent, or Firm — Themis Law

(57) ABSTRACT

An air cleaner includes a rear filter receiving air from the outer environment, an ionizer grid connected to a high voltage power supply and having wires extending between opposite sides of a frame such to emit positively charged ions and apply an electrostatic charge on the air received from the rear filter; a collector grid connected to ground and having wires extending between opposite sides of a frame, the combination of the ionizer and collector grids causing the air to move toward the collector grid; a front filter collecting contaminants suspended in the air received from the collector grid; and an apparatus frame housing the rear filter, the ionizer and collector grids, and the front filter, wherein the frames of the ionizer and collector grids are suspended within the apparatus frame with isolating members made of a non-arc tracking material, such to minimize coronal discharge and reduce audible noise.

20 Claims, 4 Drawing Sheets

(51) Int. Cl.
*B03C 3/41* (2006.01)
*H01T 23/00* (2006.01)
*B03C 3/09* (2006.01)
*B03C 3/36* (2006.01)
*B03C 3/47* (2006.01)
*B03C 3/74* (2006.01)
*F24F 13/24* (2006.01)
*F24F 13/28* (2006.01)
*B03C 3/70* (2006.01)
*H01T 19/00* (2006.01)
*B03C 3/12* (2006.01)
*B03C 3/155* (2006.01)
*B01D 53/86* (2006.01)
*B03C 3/011* (2006.01)
*B03C 3/019* (2006.01)
*F24F 3/16* (2006.01)

(52) U.S. Cl.
CPC ................ *B03C 3/09* (2013.01); *B03C 3/12* (2013.01); *B03C 3/155* (2013.01); *B03C 3/368* (2013.01); *B03C 3/41* (2013.01); *B03C 3/47* (2013.01); *B03C 3/70* (2013.01); *B03C 3/743* (2013.01); *F24F 3/1603* (2013.01); *F24F 13/24* (2013.01); *F24F 13/28* (2013.01); *H01T 19/00* (2013.01); *H01T 23/00* (2013.01); *B01D 2255/2073* (2013.01); *B01D 2255/20761* (2013.01); *B01D 2257/106* (2013.01); *B03C 2201/04* (2013.01); *B03C 2201/14* (2013.01); *B03C 2201/28* (2013.01); *F24F 2003/1682* (2013.01)

(58) Field of Classification Search
CPC ............ B03C 2201/04; B03C 2201/14; B03C 2201/28; B03C 3/011; B03C 3/019; B03C 3/09; B03C 3/12; B03C 3/155; B03C 3/368; B03C 3/41; B03C 3/47; B03C 3/70; B03C 3/743; B03C 3/86; F24F 13/24; F24F 13/28; F24F 2003/1682; F24F 3/1603; H01T 19/00; H01T 23/00
See application file for complete search history.

(56) References Cited

U.S. PATENT DOCUMENTS

| | | | | |
|---|---|---|---|---|
| 4,284,420 | A * | 8/1981 | Borysiak | B03C 3/743 96/40 |
| 7,595,030 | B2 * | 9/2009 | Joannou | B03C 3/12 422/121 |
| 2004/0226447 | A1 | 11/2004 | Lau et al. | |
| 2005/0109204 | A1 | 5/2005 | Coppom | |
| 2006/0288871 | A1 | 12/2006 | Crapser | |
| 2007/0148061 | A1 * | 6/2007 | Lau | F24F 3/166 422/186.04 |
| 2009/0044974 | A1 * | 2/2009 | Bologa | B03C 3/36 174/668 |
| 2013/0071298 | A1 * | 3/2013 | Tanimura | B03C 3/014 422/187 |

FOREIGN PATENT DOCUMENTS

| | | |
|---|---|---|
| JP | H4161211 | 6/1992 |
| JP | H05169972 | 7/1993 |
| JP | H1187016 | 3/1999 |
| JP | 20000005630 | 1/2000 |
| JP | 2000279844 | 10/2000 |
| JP | 2006272127 | 10/2006 |

* cited by examiner

AIR CLEANER

FIELD OF THE INVENTION

The present invention relates to an air cleaner that uses an ionizing system to accelerate air movement through the system and remove essentially all airborne pollutants. An air cleaner according to the invention generates very low noise and can be constructed to process different amounts of air. In one application, an air cleaner according to the invention can be used to clean the air of a typical bedroom.

BACKGROUND OF THE INVENTION

An air cleaner is a device that uses electrical voltage of positive polarity to ionize, or electrically charge, air molecules, which are causes to adhere to a collector member. Most commercial air cleaners are designed to generate negative ions, which are de-ionized by seeking electrodes of opposite polarity or earthed conductors, such as walls and ceilings.

Air cleaners in the prior art are disclosed, for example, in U.S. Pat. No. 3,744,217 to Ebert, U.S. Pat. No. 3,747,300 to Knudson, U.S. Pat. No. 3,999,964 to Carr, U.S. Pat. No. 4,902,306 to Burnett et al., U.S. Pat. No. 5,336,299 to Savell, U.S. Pat. No. 7,595,030 to Joannou, U.S. Pat. No. 7,785,404 to Leng et al., U.S. Pat. No. 8,795,601 to Wiser et al.; U.S. patent application publication no. 2004/0226445 to Su et al.; and international publication no. WO 2012/125715 to KAZ Europe S.A.

Air cleaners in the prior art, however, fail to completely control the dispersion of air contaminants in the outer environment by allowing some of the contaminants to escape and either remain suspended in the air or adhere to walls and ceilings. Moreover, air cleaners in the prior art produce noise, even when air movement is powered electrokinetically, without the use of fans.

SUMMARY OF THE INVENTION

An air cleaner, or air purifier, constructed according to the principles of the invention overcomes the drawbacks in the prior art. In is basic elements, an air cleaner according to the invention includes a rear filter that receives air from the outer environment, an ionizer grid coupled to a high voltage power supply, which receives air from the rear air filter and emits positively charged ions that apply an electrostatic charge to the air, a collector grid coupled to ground, which attracts the electrostatically charged air, a front filter, which receives the air from the collector grid and collects contaminants suspended therein, and a frame that houses the rear filter, the ionizer grid, the collector grid, and the front filter. In operation, the electrostatic charge applied to the air causes the air to move through the air cleaner in the direction of the collector grid.

The ionizer and collector grids may be constructed to each have a frame and a plurality of wires extending between opposite sides of the frame. In one embodiment, the wires of the ionizer grid extend vertically and those of the collector grid extend horizontally. A plurality of beads may be disposed along the wires of the collector grid, in order to remove encrustations that may build up thereon.

The frames of the ionizer and collector grid are suspended within the apparatus frame with isolating members that are made of a non-arc tracking material, such to minimize coronal discharge and audible noise. In one embodiment, the isolating members are made of an elastic non-arc tracking material and are shaped to have no sharp and jagged edges to further minimize coronal discharge and audible noise. The ionizer and collector grids may also be shaped to have no sharp or jagged edges to minimize coronal discharge and audible noise to an even greater degree.

One or both of the rear and front filters may be HAF (High Air Flow) filters. Further, an ozone removal catalyst may also be provided within the air cleaner.

In one embodiment, the high voltage power supply includes output over-current protection that causes the high voltage power supply to shut off when unwanted high voltage tracking occurs, indicating that replacement of an internal component is required, and/or when an undesired contact occurs with a user.

One or more fans may be coupled to the frame to direct the air toward the rear filter. In one embodiment, the fans are dual speed fans. A voltage shield may be disposed between fans and the ionizing grid, in order to prevent or minimize the effect colloquially known as "black wall."

In one embodiment, the high voltage power supply, the rear filter, and the front filter are provided as modular components for easy assembly in, and disassembly from, the air cleaner.

BRIEF DESCRIPTION OF THE DRAWINGS

The drawings constitute a part of the present specification and illustrate an exemplary embodiment of the invention, which may be embodied in various forms. It is to be understood that in some instances various aspects of the invention may be shown exaggerated or enlarged to facilitate an understanding of the invention.

DETAILED DESCRIPTION OF EMBODIMENTS OF THE INVENTION

The following description relates to an embodiment of the invention. It should be understood, however, that the concepts described herein can be applied to a variety of other embodiments and, accordingly, the present description is not intended to limit the invention in any way.

Figure 1:
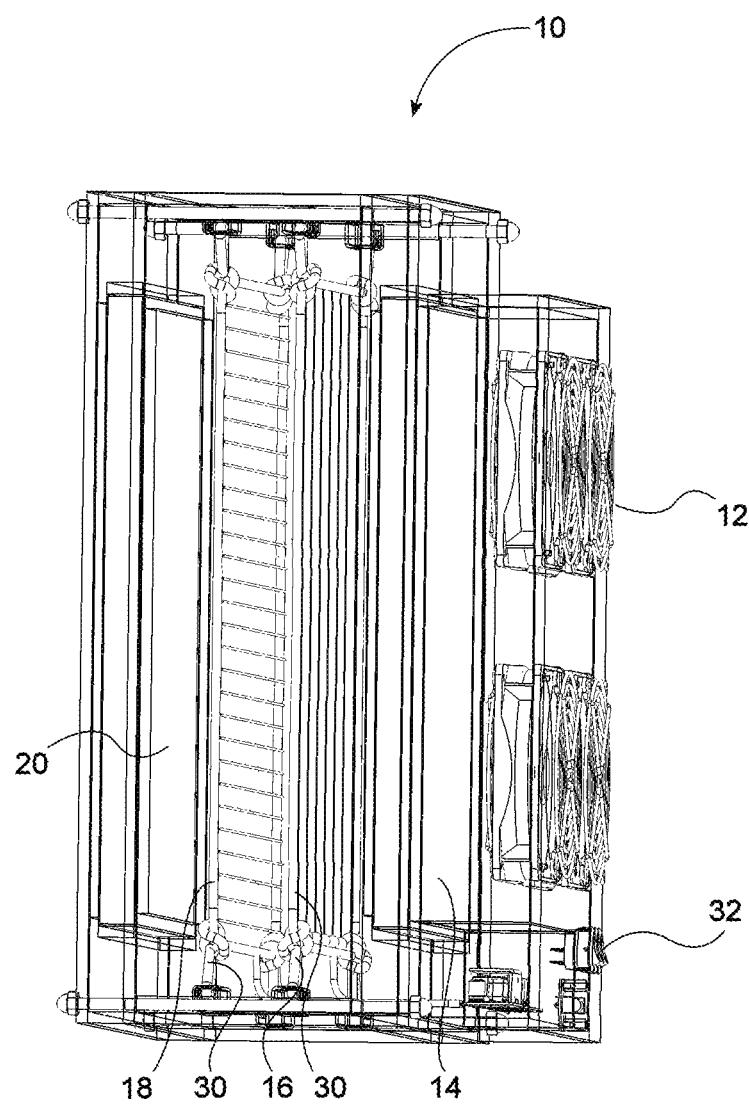
FIG. 1 illustrates an air clear according to the invention.

Referring first to FIG. 1, an air cleaner, or air purifier, 10 according to the invention includes a plurality of fans 12 in the rear area, a rear filter 14, an ionizer grid 16, a collector grid 18 and a front filter 20.

Figure 2:
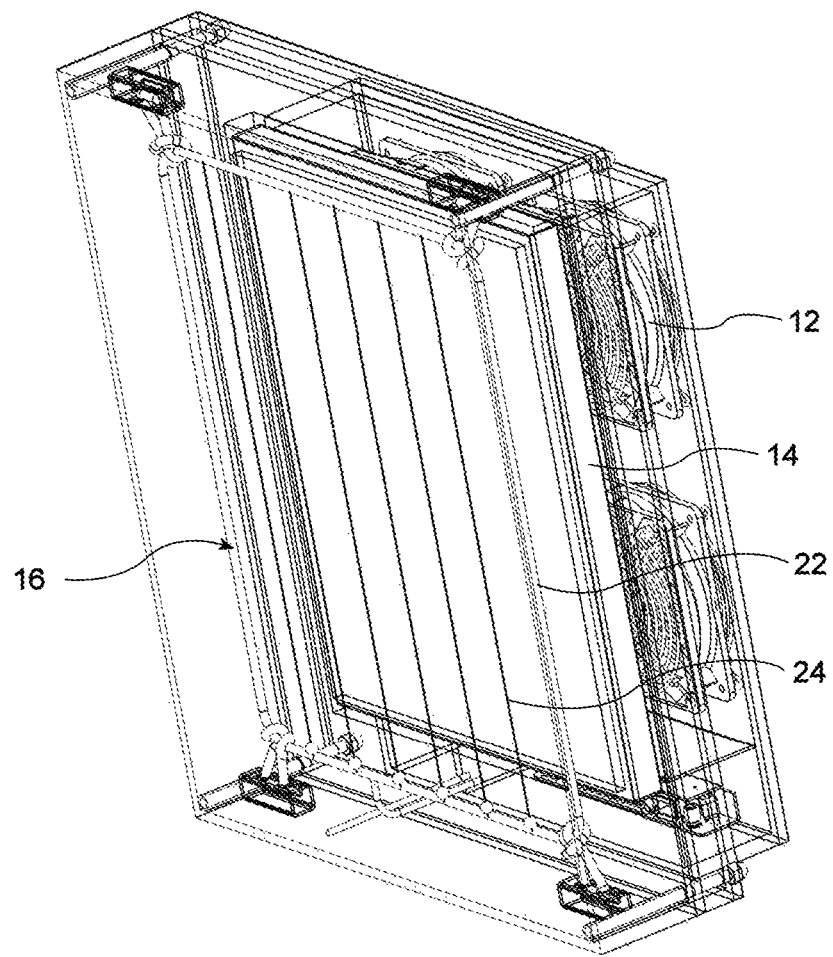
FIG. 2 illustrates a section view of the air cleaner of FIG. 1, showing the ionizer grid.

FIG. 2 illustrates a vertical cross-section of air cleaner 10 showing ionizer grid 16 in the forefront. Ionizer grid 16 is shaped has a frame 22 with a plurality of parallel wires 24 that extend between opposite sides of frame 22. In the illustrated embodiment, wires 24 extend in a vertical direction, but in different embodiments of the invention wires 24 may extend in different directions. In one embodiment, wires 24 have a diameter of 0.006" (0.15 mm).

A high voltage power supply 38 of positive polarity is connected to the grid of ionizer grid 16 and causes wires 24 to emit positively charged ions, which apply a high electrostatic charge to the surrounding air.

Figure 3:
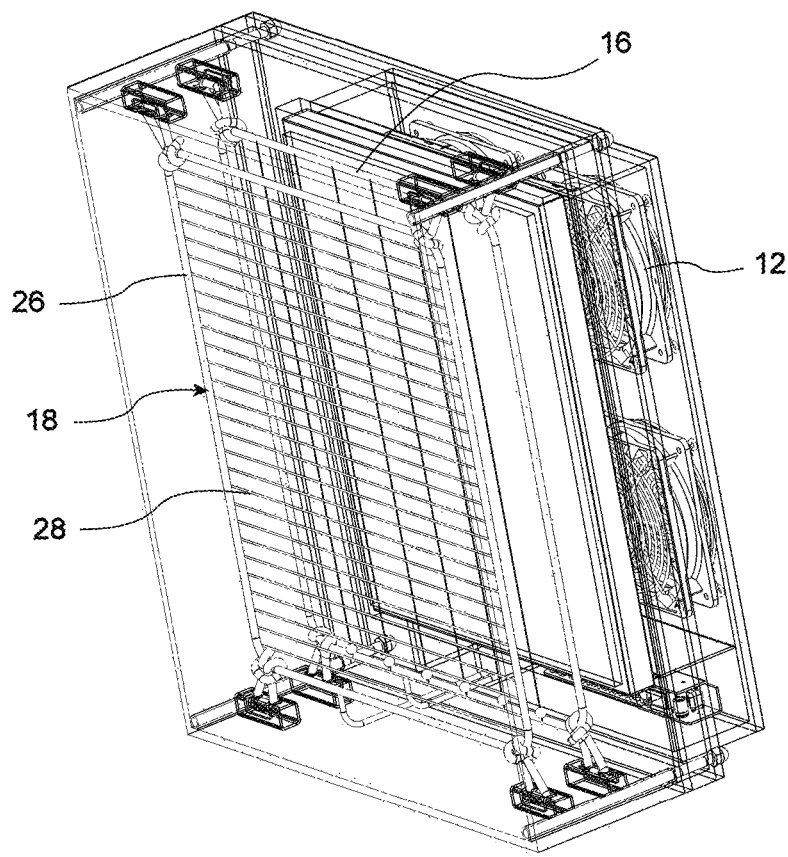
FIG. 3 illustrates a section view of the air cleaner of FIG. 1, showing the collector grid.

Turning now to FIG. 3, which illustrates a different vertical cross-section of air cleaner 10, the charged air is attracted to collector grid 18, which is disposed behind ionizer grid 16 in vertical and parallel position and which is at ground or near ground potential. Collector grid 18 is also shaped like a grid and in the illustrated embodiment includes a frame 26, with parallel wires 28 extending in a horizontal direction between opposing sides of frame 26. Even in this case, in different embodiments of the invention, wires 28 may extend in different directions.

The air, positively charged by ionizer grid 16, becomes attracted to collector grid 18 that is at ground or near ground and moves towards it. One aspect of the present invention is the ability to obtain air flow even without the use of fans 12 due to the air movement caused by the combined operation of ionizer grid 16 and collector grid 18.

Preferably, ionizer grid 16 and collector grid 18 are shaped to have no sharp or jagged edges to further minimize coronal discharge and reduce audible noise.

Moreover, the high voltage field applied to the air by ionizer grid 16 causes a destruction of essentially all airborne contaminants such as bacteria, pollen and other particles. "High voltage" is defined herein as a voltage higher than 16,000 V; in a preferred embodiment, the voltage is 28,000 V.

With reference now to FIGS. 1 and 2, a rear filter 14 is disposed between fans 12 and ionizer grid 16 and operates as an inlet filter that captures large particles as they enter air cleaner 10. Rear filter 14 is preferably shaped like a flat layer that is disposed perpendicular to the incoming air flow.

In one embodiment, rear filter 14 is a HAF (High Air Flow) air filter having an open channel construction which, due to its unique microstructure, material, and electrostatic charge, provides effective particle capture and retention. One such filter is produced by the 3M Corporation. One aspect of the present invention is the discovery that the filtering properties of the HAF front filter 14 are enhanced by the high voltage field generated by ionizer grid 16.

A front filter 20 is situated downstream of collector grid 18 and may also be configured as a flat layer that is disposed parallel to front filter 14, ionizer grid 16 and collector grid 18. Front filter 18 may also be a HAF air filter and captures any remaining airborne contaminants that are not captured by rear filter 12 or collector grid 18. The final capture by second filter 20 is greatly enhanced by the positive charge on those airborne particles that is applied by ionizer grid 16.

It should be noted that the above described air cleaning process produces ozone, which is eliminated by adding an ozone-removal catalyst such as Carulite (a manganese oxide/copper oxide catalyst produced by the Cams Corporation). The ozone-removal catalyst may be provided in powder, granular or mesh form and enables a reduction of ozone generation to less than the maximum levels allowed by the U.S. Environmental Protection Agency and the California Resources Board. In one embodiment, the ozone-removal catalyst may be provided as a power impregnated in front filter 20.

The above described air cleaner provides for a very effective removal of airborne particles. Measurements of 1μ and 5μ airborne particles have shown exit air readings, which indicate a 100% removal level based on particle counting devices that are standard in the industry, such as those made by the Dylos Corporation.

As discussed above, an air cleaner according to the invention does not require fans to produce air movement, but fans 12 may be added in the rear portion of air cleaner 10 for user convenience, for example, to increase airflow in a room or the amount of processed air.

In one embodiment of the invention, a LED indicator may be added in the front part of the air cleaner to indicate that the air cleaner is in operation. Because the LED indicator may be bright, some users may find that inconvenient, for example, during nighttime use. In one embodiment, a photocell may be added that dims the LED indicator when the environment becomes darker. Such photocell may be actuated manually or may act to dim the LED indicator automatically, for example, upon a decrease in ambient light.

In one embodiment, the speed of fans 12 may be increased or reduced by varying the amount of voltage supplied to fans 12. For example, some users may prefer that the fans run at low speed in order to reduce noise. In one embodiment, optically controlled, dual speed fans may be used for quieter operation.

A person of skill in the art will appreciate that different numbers of fans may be provided in different embodiments depending on projected air flow requirements. For example, a single fan may be provided, or two, four, or six fans.

Other users may prefer that the fans run at high speed, although an increase in air flow through air cleaner 10 may increase the risk of some airborne particles escaping. When high flow fans have been used, a particle density in treated air of 10 ppm has been measured.

It is desirable to protect fans 12 from the negative effects on their electronics caused by the high voltage field. To that end, a voltage shield may be provided between fans 12 and ionizer grid 16.

The frames of ionizer grid 16 and collector grid 18 may be attached to anchor points on the support frame of air cleaner 10 with isolating members 30 (visible in FIGS. 1 and 4), which, in one embodiment, may be made of a non-arc tracking materials and preferably of an elastic non-arc tracking material, such to elastically suspend ionizer grid 16 and collector grid 18 within the support frame of air cleaner 10. Examples of non-arc racking materials include butyl rubber, silicone rubber, tetrafluoro ethylene, hexafluoropropylene, vinyledene fluoride, and polybutylene terephthalate. Isolating members 30 operate, among other things, to minimize coronal discharge and minimize audible noise.

Figure 4:
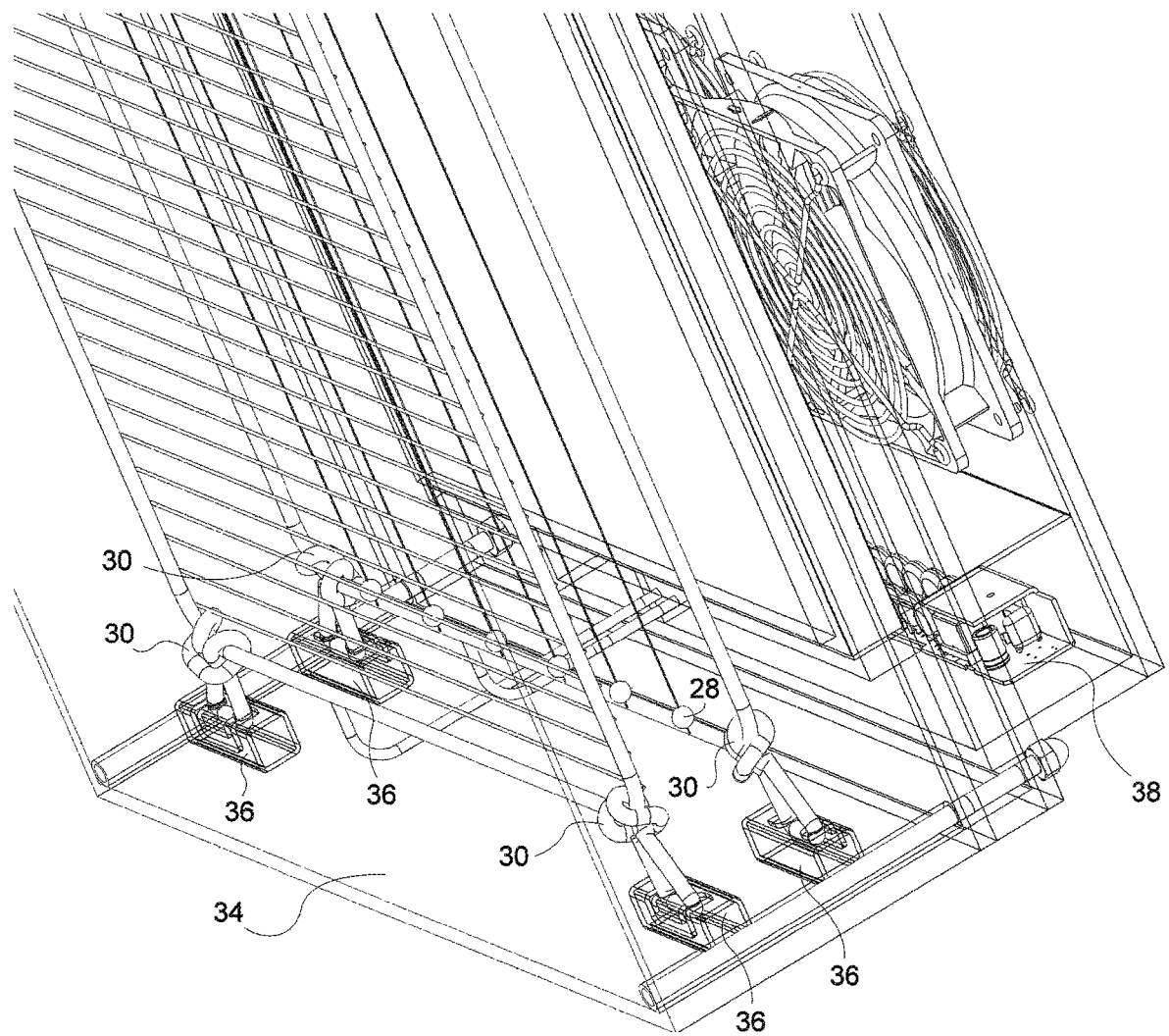
FIG. 4 illustrates a detail view of the air cleaner of FIG. 1, showing the isolating member and the attachment members thereof.

Preferably, isolating members 30 are shaped to have no sharp and jagged edges in order to further minimize coronal discharge and audible noise. In the embodiment illustrated in FIG. 4, isolating members 30 are shaped as cylindrical strings that are knotted around a portion of frames 22 and 26 and that have ends coupled to attachment members 36 on an inner surface of frame 34.

In different embodiments of the invention, components may be added to air cleaner 10 that increase efficiency and reduce maintenance.

For example, the grid wires of ionizer grid 16 may become encrusted after time due to ionized particles adhering to them. Among other things, this incrustation increases operating noise. With reference to FIG. 4, a plurality of beads 28 may be provided at one end of the grid wires (for example, at the bottom of the grid wires if those wires are in vertical position) that can be slid up and down the respective wire and remove encrustation.

As another example, a wall behind air cleaner 10 (for example, a wall of the room where air cleaner 10 is placed) may become soiled due to airborne particles in the area behind air cleaner 10 becoming charged if some of the high voltage field extends beyond the rear of air cleaner 10. The charge on those particles causes them to adhere to the room wall. This effect is colloquially known as the "black wall" effect.

In one embodiment of the invention, the "black wall" effect is prevented by adding one or more fans on the rear portion of air cleaner 10 to disperse those charged particles and prevent the "black wall" effect. In another embodiment, fan guards (for example, grounded fan guards) may be employed that prevent or reduce the high voltage field at the rear of the air cleaner.

Over time, front and rear filters 14 and 20 become dirty and need to be changed.

Moreover, the power supply, electric fan motor, rear and front filters 14 and 20, ionizer and collector grids 16 and 18, and isolating members 30 may need to be replaced to tailor the air cleaner to local conditions, for example, for use in a highly polluted environment, in foreign countries or for maintenance purposes.

To facilitate maintenance and operation under different conditions, the power supply, electric motor, rear and front filters 14 and 20, and ionizer and collector grids 16 and 18 may be provided as modular components that can be replaced individually, or in subgroups packed as one or more cartridges. In one embodiment, air cleaner 10 has a top door, which provides access to the interior and allows replacement of one or more components or cartridges. Interlock sensors may be provided, which block operation of air cleaner 10 if the top door or any other part of air cleaner 10 is opened, in order to prevent access to the interior of air cleaner 10 during operation.

In one embodiment, the high voltage power supply includes output over-current protection, which causes the high voltage power supply to shut off when unwanted high voltage tracking occurs, thereby indicating that replacement of an internal component is required. Conversely, the high voltage power supply may include output over-current protection to safeguard a user should an undesired contact with inner parts of air cleaner 10 occur.

Control elements such as knobs or switches 32 may also be provided, for example on a front panel of air cleaner 10, to enable a user to start, stop or otherwise control operation of air cleaner 10.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art.

The invention claimed is:

1. An air cleaner comprising:
a rear filter receiving air from an outer environment;
an ionizer grid operatively coupled to a high voltage power supply, the ionizer grid having a frame and a plurality of wires extending between opposite sides of the frame, the ionizer grid receiving air from the rear air filter and emitting positively charged ions that apply an electrostatic charge to the air;
a collector grid operatively coupled to ground, the collector grid having a frame and a plurality of wires extending between opposite sides of the frame, the electrostatic charge causing the air to move toward the collector grid;
a front filter receiving the air from the collector grid and collecting contaminants suspended in the air; and
an apparatus frame housing the rear filter, the ionizer grid, the collector grid, and the front filter,
wherein the frames of the ionizer grid and of the collector grid are suspended within the apparatus frame with isolating members made of a non-arc tracking material, such to minimize coronal discharge and audible noise.

2. The air cleaner according to claim 1, wherein the high voltage power supply provides a positive voltage to the ionizer grid higher than 16,000 V.

3. The air cleaner according to claim 1, wherein the high voltage power supply provides a positive voltage to the ionizer grid of 28,000 V.

4. The air cleaner according to claim 1, wherein the isolating members are made of an elastic non-arc tracking material.

5. The air cleaner according to claim 1, wherein the isolating members are shaped to have no sharp and jagged edges to further minimize coronal discharge and audible noise.

6. The air cleaner according to claim 1, wherein the rear filter is a HAF (High Air Flow) filter.

7. The air cleaner according to claim 1, wherein the front filter is a HAF (High Air Flow) filter.

8. The air cleaner according to claim 1, further comprising an ozone removal catalyst provided within the air cleaner.

9. The air cleaner according to claim 1, further comprising a plurality of beads each sliding along a wire of the collector grid, such to remove an encrustation on the wire.

10. The air cleaner according to claim 1, wherein the ionizer grid and the collector grid are shaped to have no sharp or jagged edges to further minimize coronal discharge and audible noise.

11. The air cleaner according to claim 1, wherein the high voltage power supply includes output over-current protection causing the high voltage power supply to shut off when unwanted high voltage tracking occurs, thereby indicating that replacement of an internal component is required.

12. The air cleaner according to claim 1, further comprising one or more fans coupled to the apparatus frame to direct the air toward the rear filter.

13. The air cleaner according to claim 12, wherein the one or more fans are dual speed fans.

14. The air cleaner according to claim 12, further comprising a voltage shield disposed between the one or more fans and the ionizing grid.

15. The air cleaner according to claim 1, wherein one or more of the high voltage power supply, the rear filter, and the front filter are provided as modular components for easy assembly in, and disassembly from, the air cleaner.

16. A method of cleaning air comprising:
providing an air cleaner comprising:
a rear filter receiving air from an outer environment;
an ionizer grid operatively coupled to a high voltage power supply, the ionizer grid having a frame and a plurality of wires extending between opposite sides of the frame, the ionizer grid receiving air from the rear air filter and emitting positively charged ions that apply an electrostatic charge to the air;
a collector grid operatively coupled to ground, the collector grid having a plurality of wires extending between opposite sides of a frame, the electrostatic charge causing the air to move toward the collector grid;
a front filter receiving the air from the collector grid and collecting contaminants suspended in the air; and
an apparatus frame housing the rear filter, the ionizer grid, the collector grid, and the front filter,
wherein the frames of the ionizer grid and of the collector grid are suspended within the apparatus frame with isolating members made of a non-arc tracking material, such to minimize coronal discharge and audible noise; and operating the air cleaner to cause the air to flow through the air cleaner.

17. The method according to claim 16, wherein providing the air cleaner comprises providing a high voltage power supply that provides a positive voltage to the ionizer grid higher than 16,000 V.

18. The method according to claim 16, wherein providing the air cleaner comprises providing a high voltage power supply that provides a positive voltage to the ionizer grid of 28,000 V.

19. The method according to claim 16, wherein providing the air cleaner further comprises providing the isolating members made of an elastic non-arc tracking material.

20. The method according to claim 14, wherein providing the air cleaner further comprises providing the isolating members shaped to have no sharp or jagged edges to further minimize coronal discharge and audible noise.

* * * * *